No. 651,850. Patented June 19, 1900.
W. H. HALL.
PROGRAM CLOCK.
(Application filed Sept. 6, 1898.)

(No Model.) 6 Sheets—Sheet 1.

No. 651,850. Patented June 19, 1900.
W. H. HALL.
PROGRAM CLOCK.
(Application filed Sept. 6, 1898.)
(No Model.) 6 Sheets—Sheet 3.
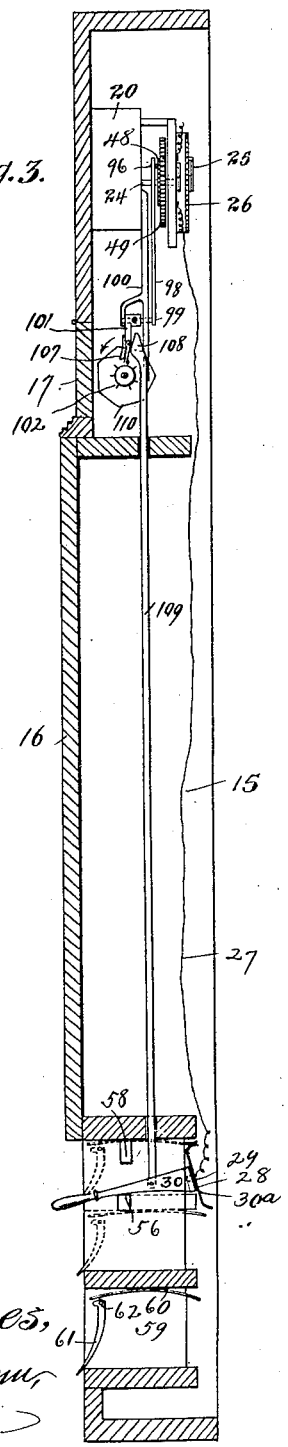
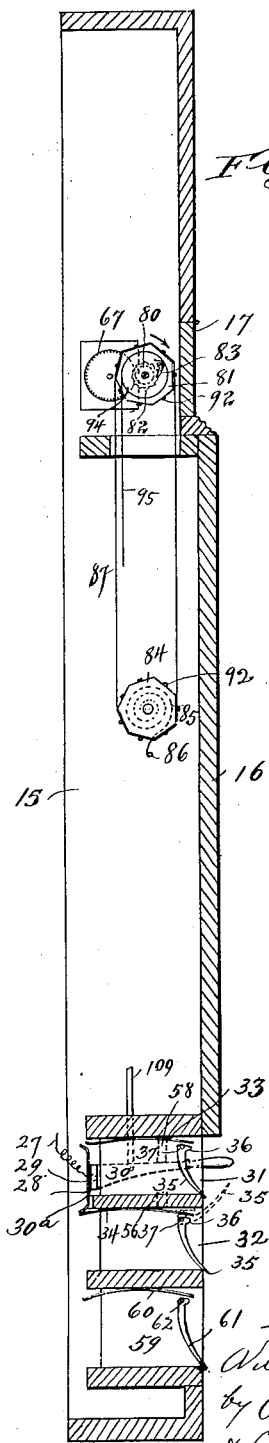
Fig. 3.
Fig. 4.
Witnesses, Inventor,
William H. Hall
by Offield, Towle
& Linthicum,
Attys.

No. 651,850. Patented June 19, 1900.
W. H. HALL.
PROGRAM CLOCK.
(Application filed Sept. 6, 1898.)
(No Model.) 6 Sheets—Sheet 4.
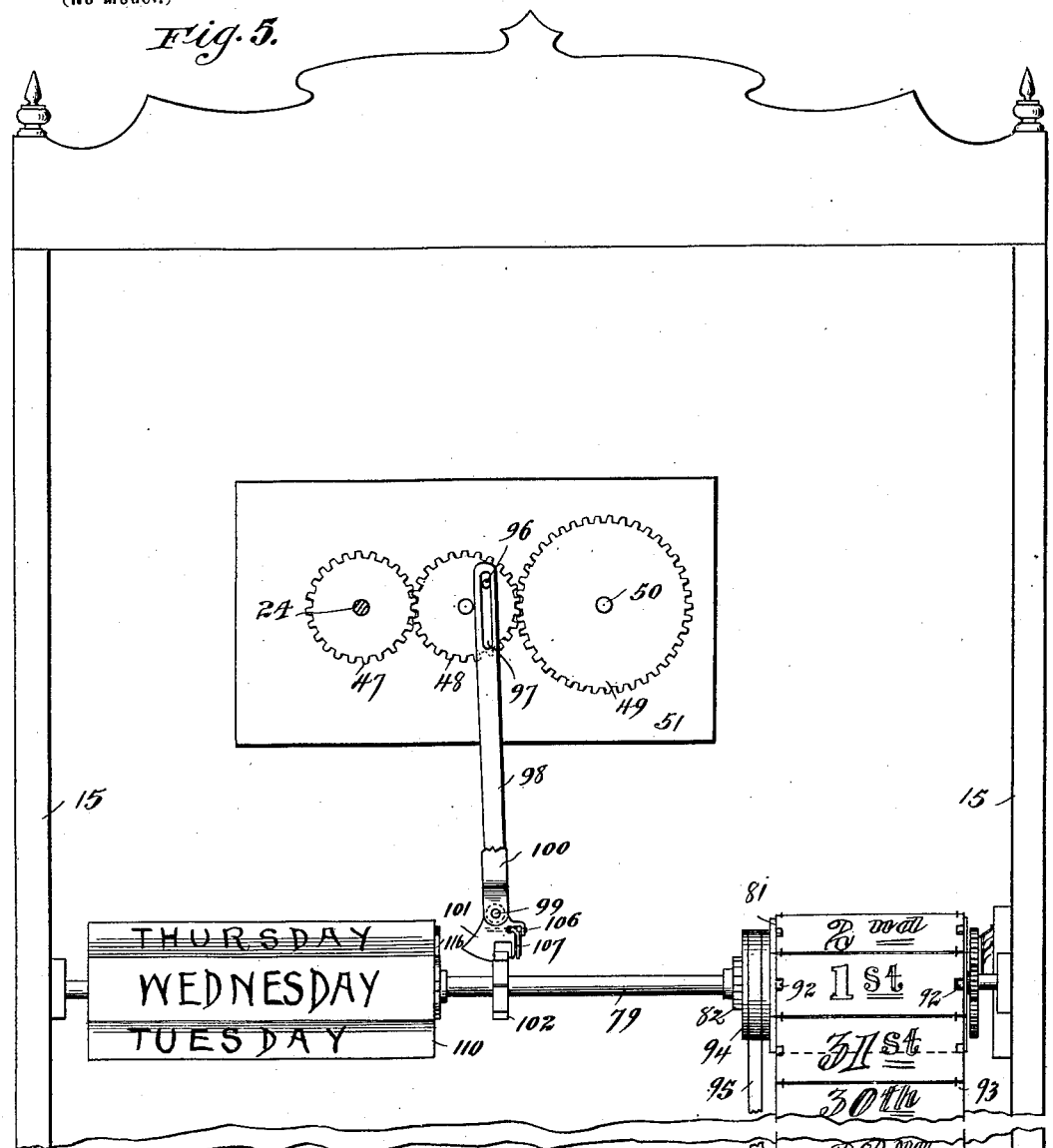
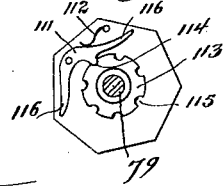
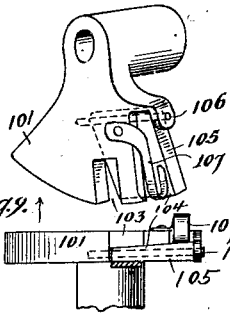
Witnesses,
Inventor,
William H. Hall,
by Offield, Towle & Linthicum
Attys.

No. 651,850. Patented June 19, 1900.
W. H. HALL.
PROGRAM CLOCK.
(Application filed Sept. 6, 1898.)

(No Model.) 6 Sheets—Sheet 5.

Witnesses,

Inventor,
William H. Hall,
By Offield, Towle & Linthicum
Atty's.

No. 651,850. Patented June 19, 1900.
W. H. HALL.
PROGRAM CLOCK.
(Application filed Sept. 6, 1898.)

(No Model.) 6 Sheets—Sheet 6.

Witnesses,

Inventor,
William H. Hall,
By Offield, Towle & Linthicum,
Atty's.

THE NORRIS PETERS CO., PHOTO-LITHO., WASHINGTON, D. C.

UNITED STATES PATENT OFFICE.

WILLIAM H. HALL, OF CHICAGO, ILLINOIS, ASSIGNOR TO ALVARADO T. BENSON, HARRY J. CASSADAY, AND MATTIE A. HALL, OF SAME PLACE.

PROGRAM-CLOCK.

SPECIFICATION forming part of Letters Patent No. 651,850, dated June 19, 1900.

Application filed September 6, 1898. Serial No. 690,292. (No model.)

*To all whom it may concern:*

Be it known that I, WILLIAM H. HALL, of Chicago, in the county of Cook and State of Illinois, have invented certain new and useful Improvements in Program-Clocks, of which the following is a specification.

This invention relates to program-clocks, and has for its object to provide a clock by means of which at any predetermined hour or subdivision of an hour of any day for one month in advance attention may be called to any memoranda which may require it at that time. To this end the invention consists in certain novel features, which I will now proceed to describe, and will then particularly point out in the claims.

Figure 1:
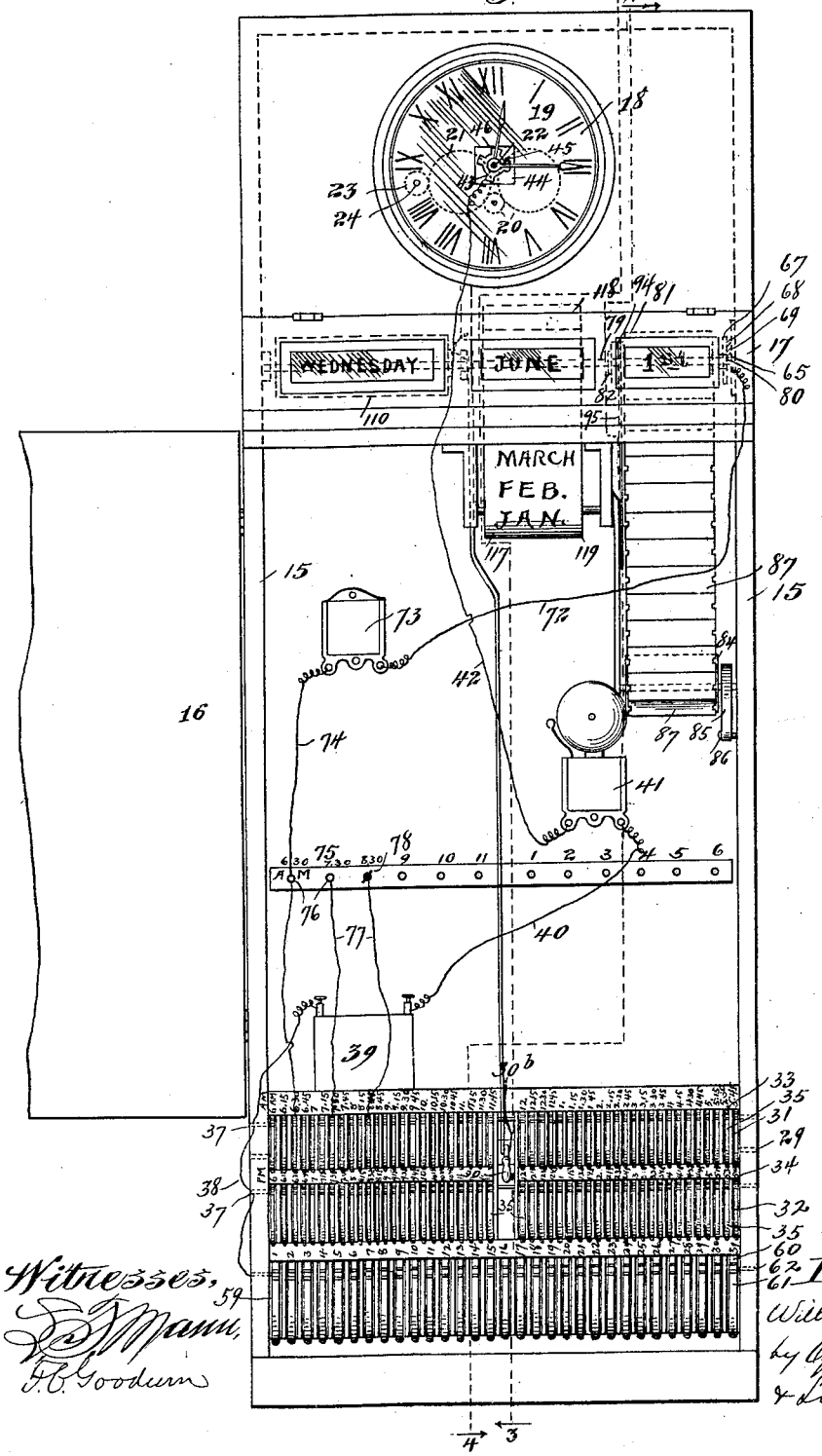
Figure 2:
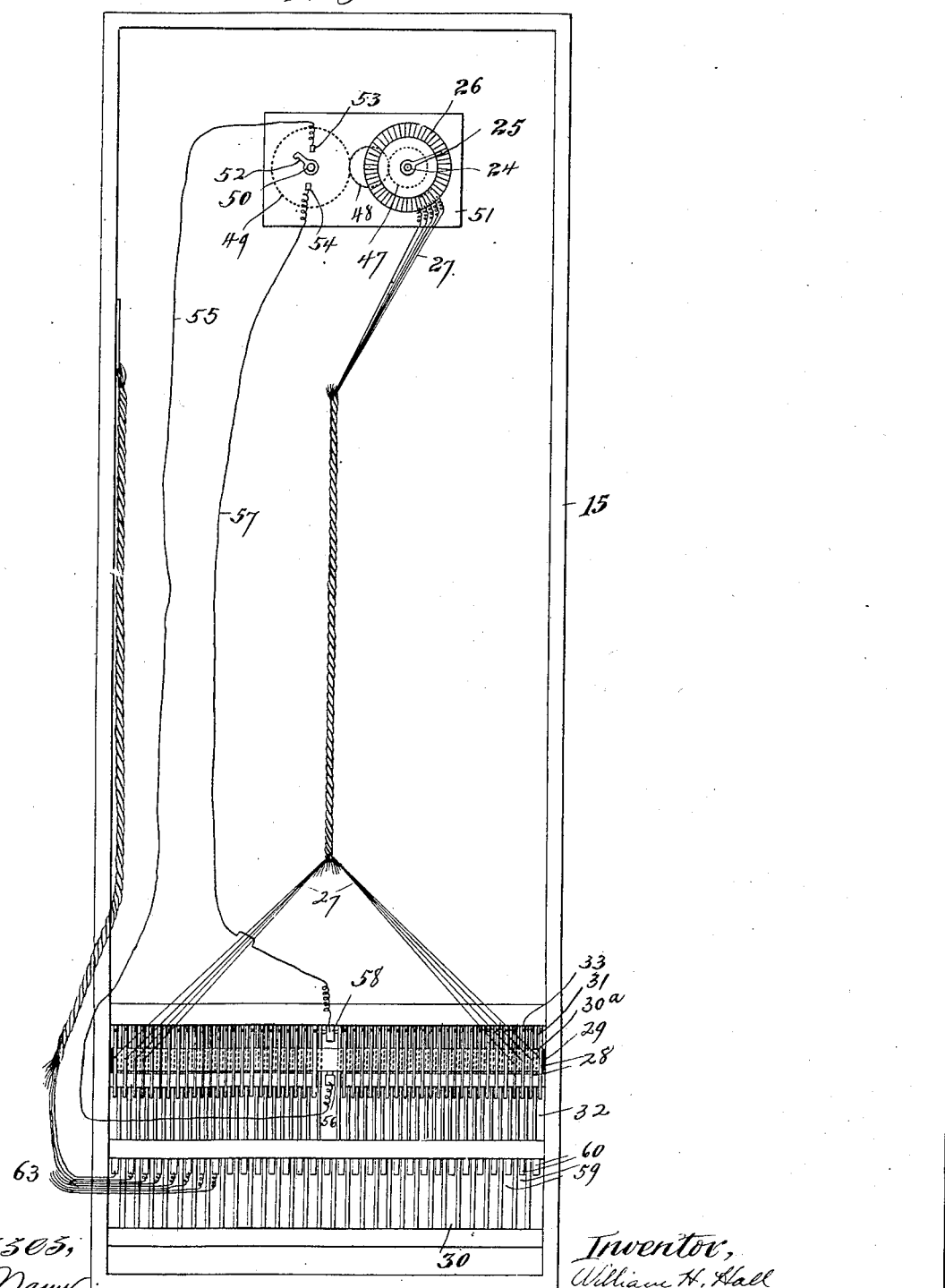
Figure 6:
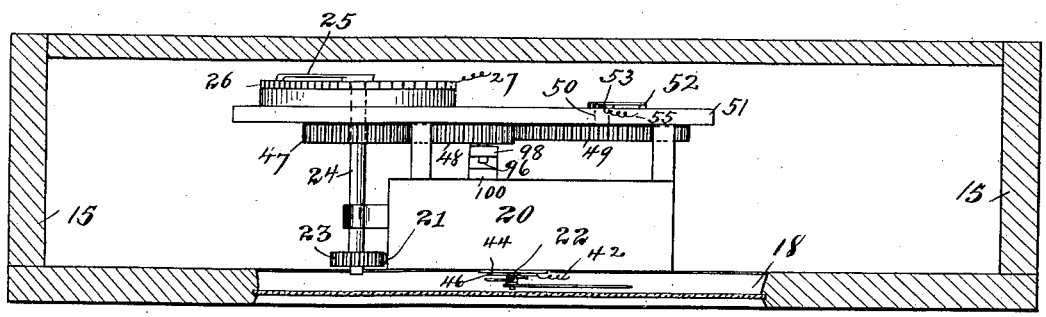
Figure 10:
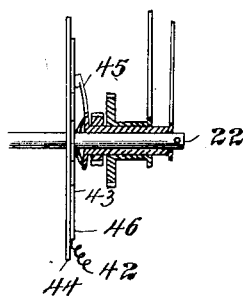
Figure 11:
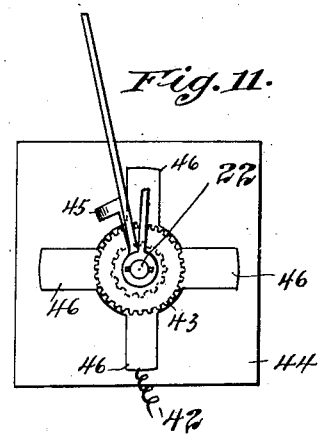
Figure 12:
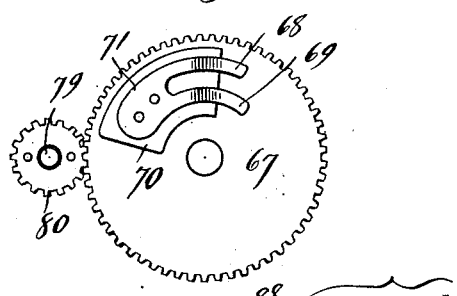
Figure 13:
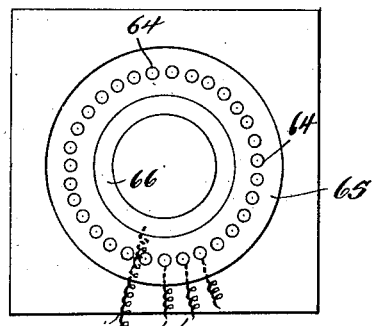
Figure 14:
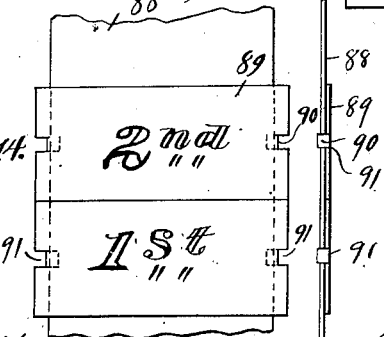

In the accompanying drawings, Figure 1 is a front elevation of a clock embodying my invention, the door of the case being open to show the internal construction. Fig. 2 is a rear view of the same, the back being removed to show the underlying construction. Fig. 3 is a vertical sectional view taken on the line 3 3 of Fig. 1 and looking in the direction of the arrow. Fig. 4 is a similar view taken on the line 4 4 of Fig. 1 and looking in the opposite direction. Fig. 5 is an enlarged detail front elevation of the upper portion of the device, the clock proper and other portions of the mechanism being omitted. Fig. 6 is an enlarged detail plan view of the clock mechanism proper. Fig. 7 is a detail end elevation of a portion of the calendar mechanism. Fig. 8 is a perspective view of the escapement controlling the calendar mechanism. Fig. 9 is a bottom plan view of the same. Fig. 10 is a detail side elevation, partly in section, of the mechanism whereby the quarter-hourly contacts are completed. Fig. 11 is a front elevation of the structure shown in Fig. 8. Fig. 12 is a detail face view of a portion of the contact mechanism whereby the daily contacts are made. Fig. 13 is a similar view of the coöperating part of the mechanism, and Fig. 14 shows in front and side elevation a portion of the endless band or belt of the calendar mechanism, which serves to indicate the days of the month.

The said drawings show a clock embodying in one practical form the several features of my invention, and I will now proceed to describe that specific embodiment, it being understood, of course, that the invention may be embodied in other forms.

In said drawings, 15 indicates a suitable framework or casing which incloses and supports the various devices and mechanisms of the clock, it being shown in the present instance as provided with a hinged door 16 at the front to give access to the interior of the central portion of the clock and with a smaller transversely-hinged door 17 above the same to give access to the calendar mechanism. A suitable opening 18, which may be glazed, if desired, serves to permit inspection of the face of the clock proper 19, which is located in the upper portion of the casing.

20 represents the clock movement or train, which may be of any approved construction, the great wheel being indicated at 21 and the center wheel or minute-hand shaft or arbor being indicated at 22. A pinion 23 meshes with the great wheel 21 and is mounted upon a shaft or arbor 24, which is extended rearward from the clock mechanism and is provided at its rear extremity with a contact-arm 25. The shaft 24 makes one complete revolution once in twelve hours, and during that revolution the contact-arm 25 travels over an annular series of insulated contacts 26. There are forty-eight of these contacts, so that the contact-arm 25 occupies about fifteen minutes in passing over each contact of the series. Each of the contacts 26 is electrically connected by a wire 27 with a corresponding contact 28, and these contacts 28 are mounted in a row or series upon a shaft or axis 29, which may be rocked or oscillated by means of a handle or lever 30. The contacts 28 are insulated from the shaft 29 and from each other by means of an insulating block or plate 30ª. In connection with this portion of the device I employ two series of pigeonholes or compartments, corresponding in number with the contacts 26 and 28 and located, preferably, one above the other, as shown in the drawings, the upper series of compartments being indicated at 31 and the lower series at 32. Each upper compartment 31 has mounted within it a contact 33, which is preferably a spring-contact having yielding terminal portions, and each lower compartment 32 is provided with a similar spring-contact 34.

It will be observed from an examination of Figs. 3 and 4 that by means of the lever 30 the shaft 29 may be so turned as to bring the series of contacts 28 either into contact with the upper series of contacts 33, as indicated in Fig. 3, or with the lower series of contacts 34, as indicated in Fig. 4. Each of the compartments 31 and 32 is provided at its front end with a pivoted contact-lever 35, which may be and preferably is of sufficient width to close the mouth of the compartment when in the lower position. (Shown in full lines in Figs. 3 and 4.) When in this position, the lever is not in electrical contact with the corresponding contact 33 or 34. The lever may, however, be turned into the position shown in dotted lines in Fig. 4, in which position it will be in electrical contact with the corresponding spring 33 or 34 and will permit free access to the interior of the compartment. In order to hold the lever in this open position, it is provided with a projection 36, which comes into contact with the spring, and when the said projection is in line with the pivot of the lever or slightly beyond the same, the spring will obviously hold the lever in this open position, while permitting it to be readily closed when it is desired to break the contact.

The levers 35 are mounted upon axes 37, each axis being common to all the levers of one of the series of compartments, and the levers are in electrical communication with their respective axes, and these latter are connected by a wire 38 to one terminal of a battery 39 or other suitable source of electricity. The lever 30 is electrically connected with one of the axes 37—as, for instance, by means of a wire 30$^b$. The other terminal of the battery is connected by a wire 40 to a bell 41 or other suitable audible signal, and this in turn is connected by a wire 42 to a contact-plate 43, located in the clock proper and concentric with the minute-hand shaft 22, from which it is insulated, being supported upon a suitable plate or base 44 of insulating material. The shaft 22 is in electrical connection through the clock mechanism with the shaft 24 and contact-arm 25, and said shaft 22 is provided with a contact-arm 45. The contact-plate 43 is provided with four radial arms 46, arranged at right angles to each other and adapted to be successively engaged by the end of the contact-arm 45. The arms 46 are of sufficient width to maintain the contact with the arm 45 for about five minutes, the intervening cut-away portions between the arms serving to interrupt the contact for about ten minutes.

There is mounted on the shaft 24 a gear-wheel 47, which meshes with a gear-wheel 48 of similar size, this latter in turn meshing with a gear-wheel 49 of double the number of teeth of the gear-wheels 47 and 48, secured to a shaft 50, mounted in a suitable bearing in the base-plate 51, which carries these several gear-wheels and the contacts 26. It will be noted that since the shaft 24 rotates once in twelve hours the shaft 50 will obviously rotate once in twenty-four hours, and it should be stated that said shaft 50 is in electrical connection with the shaft 24 in any suitable manner—as, for instance, through the intermediate gearing. The shaft 50 is also provided with a contact-arm 52, and there are mounted on the insulated base 51 two fixed contacts 53 and 54, located at points diametrically opposite each other and so as to be successively engaged by the contact-arm 52, which will travel from one to the other in twelve hours. The fixed contact 53 is connected by a wire 55 with a fixed contact 56 adjacent to the lever 30, while the fixed contact 54 is connected by a wire 57 with a fixed contact 58, also adjacent to the lever 30. The contacts 56 and 58 are so arranged relatively to the lever that said lever will engage the lower contact 56 when in the depressed position, (shown in Fig. 3,) while it will engage the upper contact 58 when in the raised position. (Shown in Fig. 4.) Said lever 30 or that portion thereof which engages the contacts is, as already stated, in electrical communication with one of the axes 30.

The mechanism heretofore described operates in the following manner: The compartments 31 of the upper series are marked to represent the several quarter-hourly divisions of time from 6 a. m. to 5.45 p. m., while the compartments 32 of the lower series are marked to designate the quarter-hourly divisions of time from 6 p. m. to 5.45 a. m. It is of course immaterial which series is employed for the day-time or night-time, and the use of the series may obviously be reversed, if desired. The lever 30 is so moved and held as to be in the position shown in Fig. 3, with its contacts 28 in electrical connection with the contacts 33 of the upper series of compartments during the day-time, while during the night-time it is in the position shown in Fig. 4, with its contacts 28 in electrical connection with the contacts 34 of the lower series of compartments. The levers 35 are normally depressed, so as to be out of electrical connection with the contacts 33 and 34 and so as to close the mouths of the compartments. When any matter requires attention at some future hour, a memorandum thereof is made and placed in the compartment which corresponds to the particular time at which it is desired to call attention to that memorandum. The placing of the memorandum in the compartment involves the lifting of the corresponding lever 35 into the position shown in dotted lines in Fig. 4, thus electrically connecting said lever with the corresponding contact 33 or 34 and at the same time indicating visually that the compartment contains a memorandum.

It will be observed that the contact-plate 43 is so constructed that the contact-arm 45 is in contact with the separate arms or portions 46 for only about five minutes at a time, the circuit being entirely broken between these parts for the remaining ten minutes of each quarter of an hour. The contact-arm 25 may be set slightly in advance of the actual time, as indicated on the face of the clock, so that said arm 25 will reach that one of the series of contacts 26 upon which it should bear at any given time slightly in advance of the actual time at which said contact should be made. This insures a proper contact between said arm 25 and the corresponding segment 26 before the completion of the circuit between the contact-arms 45 and 46. In this way the necessity for very minute and accurate adjustment of the arm 25 is obviated. Such adjustment is difficult to obtain at this point for the reason that the clockwork involves a number of gear-wheels with only a limited power and the gearing must necessarily be somewhat loose, thereby allowing a certain amount of play, and since the contact-arm 25 makes a revolution only once in twelve hours it will be seen that a very slight movement due to the play of the several gear-wheels necessary to operate it would make a difference of several minutes in time in the position of its contact end. By the use of the separate circuit-closing arms 45 and 46 on the face of the clock ten minutes' time is allowed for the contact-arm 25 to pass from one contact 26 to another without ringing the bell, while the contact-arm 45, being secured directly to the minute-hand shaft, moves exactly with said shaft and will make the contact to complete the entire circuit at exactly fifteen-minute intervals. When, therefore, the arm 25 is upon the contact 26 corresponding to the particular compartment in which the memorandum has been placed and when during such contact at the precise hour or quarterly subdivision of an hour the contact-arm 45 engages the corresponding arm 46, a circuit is established from the battery 39, through the bell 41, wire 42, contact-plate 43, arms 46 and 45, to the shaft 22, and through the clockwork to the shaft 24. From the shaft 24 the circuit is continued through the arm 25, contact 26, and wire 27, and thence through the contacts 28 and 34, as shown in Fig. 4, to the lever 35, shaft or axis 37, and wire 38 back to the battery. The circuit thus formed causes a ringing of the bell 41, and this ringing will continue for at least five minutes or as long as the arms 45 and 46 are in contact unless earlier terminated by depressing the lever 35, and thereby breaking the circuit at the compartment which contains the memorandum, to which attention is thus directed.

Since there are two series of compartments, each relating to twelve hours of the day, while the series of contacts 26 are only forty-eight in number and the contact-arm 25 makes one complete revolution in twelve hours, it is necessary at the expiration of each term of twelve hours to shift the lever 30 so as to establish electrical connection between the contacts 28, which are controlled by said lever, and the corresponding series of contacts 33 or 34 within the compartments. This is obviously readily done by shifting the lever on its axis to either of the positions shown in Fig. 3 or Fig. 4, as required. In the position shown in Fig. 3 the contacts are established for the series of day-compartments, while in the position shown in Fig. 4 said contacts are established for the series of night-compartments. As it may happen, however, that the shifting of the lever at the proper time—to wit, at six a. m., and at six p. m.—may be forgotten, the mechanism described provides for an audible signal to call attention to the fact that the lever requires shifting. This is accomplished by the contact of the arm 52 with the contact 53 or the contact 54, as the case may be, these contacts occurring at six a. m. and at six p. m. When the arm 52 comes into engagement with the contact 53, for instance, which will be at six p. m., the current will pass from the battery through the bell and through the clock mechanism to the shaft 50, and thence through the arm 52, contact 53, wire 55, contact 56, lever 30, wire 30$^b$, axis 37, and wire 38, back to the battery, thus sounding an audible signal which will call attention to the fact that the lever requires to be shifted so as to connect the contacts 28 with the contacts 34 of the lower or night set of compartments 32. Similarly when the arm 52 engages the contact 54, which occurs at six a. m., a current passes through the same circuit, except that the contacts 54 and 58 and the wire 57 take the place of the contacts 53 and 56 and the wire 55. Attention is thus called to the fact that the lever requires to be shifted in order to put the proper set of compartments into communication with the clock.

I have also made provision whereby an audible signal will be given at any desired time upon any predetermined day of the month. To this end I provide a third series of compartments 59, which are preferably located below the compartments 32 and are thirty-one in number, one for each day of the month. Each of these compartments contains a spring-contact 60 and a lever 61, said levers corresponding to the levers 35 and being mounted on a common axis 62, which is connected by the wire 38 to one pole of the battery 39. The contacts 60 are connected by wires 63 to a corresponding series of contact-points 64, arranged in a circle, as indicated in Fig. 13. These contact-points are mounted in a support 65 of annular form constructed of suitable insulating material, and there is provided an annulus or contact-ring 66, concentric with the series of contacts 64 and suitably insulated therefrom.

67 indicates a gear-wheel, which has mounted thereon contact-arms 68 and 69, which are insulated from the body of the gear-wheel by a block or plate 70 of suitable insulating material, which arms are electrically connected with each other, preferably by having a common body portion 71, as shown in Fig. 12. The axis of the gear-wheel 67 is concentric with the contact-ring 66 and the annular series of contacts 64, and the relative arrangement of the parts is such that the contact-arm 68 travels over and successively bears upon the contacts 64 while the arm 67 is in constant contact with the annulus 66. Motion is imparted to the gear-wheel 67 in any suitable manner, preferably by the means hereinafter described, so as to cause the arm 68 thereof to pass from one of the contacts 64 to the adjacent one once in twenty-four hours. The contact-ring 66 is connected by a wire 72 to an audible signal 73, preferably of a different character from the audible signal 41, and for this purpose I prefer to employ what is known as a "buzzer" at this point. From the buzzer 73 a wire 74 leads to a switchboard 75, which may be constructed in any suitable manner for its purpose. I prefer to employ a switchboard comprising a series of plug-sockets 76, which are connected by wire 77 to the corresponding contacts 33. Any desired number of these plug-sockets may be employed, and I have shown twelve of them, one for each hour from six a. m. to six p. m., each one being connected to the corresponding hour-contact 33. Connection is made between the buzzer and the socket corresponding with the hour at which it is desired to call attention to the memorandum to be consulted at some future day by means of a plug 78, which may be inserted in any one of the sockets 76.

With the device thus constructed the operation is as follows: A memorandum having been inserted in one of the compartments or pigeonholes 59 and the lever thereof pulled up in order to make an electrical connection with the contact 60, the plug 78 is inserted in the socket 76 corresponding with the hour at which it is desired to call attention to the memorandum. As the gear-wheel 67, which makes one revolution in a month, advances the arm 68 thereof will upon the proper day come into contact with that one of the contacts 64 which is electrically connected with the compartment 59 in which the memorandum has been placed. When the proper hour of the day is reached, an electrical circuit will be established as follows: from the battery through the bell 41 and the clock in the manner already described to the proper wire 27 and contacts 28 and 33 and thence through the corresponding wire 77 and socket-contact 76 to the plug 78. Thence the current passes, through the wire 74, buzzer 73, wire 72, contact-ring 76, arms 67 and 68, and the contact 64, to the proper wire 63 and thence to the contact 60, contact-lever 61, axis 62, and wire 38 and to the other pole of the battery. An audible signal will thus be given which by its character will call attention to the fact that the memorandum to be examined is in one of the compartments 59.

The means which I prefer for imparting to the gear-wheel 67 the necessary motion is that shown in the drawings and which I will now proceed to describe.

79 represents a shaft connected with a pinion 80, which meshes with the gear-wheel 67, the relative proportion of the pinion and wheel being such that when the pinion has moved one-seventh part of a revolution the wheel has moved so as to bring its arm 68 from one of the contacts 64 to the adjacent contact 64. The shaft 79 has mounted thereon two rollers, preferably heptagonal in cross-section and serving by means of suitable signs or indicating devices to indicate, respectively, the day of the month and the day of the week. These rollers are located back of the door 17, which is provided with openings, preferably glazed, by means of which the said signs or indicating devices may be readily seen. The roller 81 is mounted loosely on the shaft 80, but is connected thereto so as to cause said shaft to revolve along with it in one direction, by means of a ratchet-wheel 82, fast on the shaft, and a spring-pawl 83, mounted on the end of the roller and engaging said ratchet-wheel. Below the said roller 81 and parallel therewith is arranged a second roller 84, to the axis of which is secured one end of a coiled spring 85, the other end of which is secured to the casing, as indicated at 86. Around the rollers 81 and 84 passes an endless belt or chain 87, which may be constructed, as shown in detail in Figs. 1 and 14, of an endless belt or band 88, of cloth or other suitable flexible material, to which are secured metal plates 89, each bearing a numeral corresponding to a day of the month, and said numbered plates being arranged successively in a series, as shown. Each of the plates 89 is of a length somewhat greater than the width of the belt or band 88, so as to project beyond the same at each side thereof, and each plate is provided at each end with two parallel slits, forming a tongue 90, which may be bent down and around the edge of the band, as shown in dotted lines in Fig. 14, to secure the plate in position on the belt. There is thus left at each end of each plate a notch or recess 91, and the rollers 81 and 84 are provided with sprocket projections 92, which engage said notches or recesses and positively move the belt. If desired, however, this endless belt or chain may be otherwise constructed, and in Fig. 5 of the drawings I have shown it as composed of a series of plates which are pivotally connected or linked together by means of links 93. The roller 81 is provided at one side with a drum 94, around which passes a strap or belt 95, one end of which is secured to the drum, while the other end hangs free.

The shaft 79 is given a tendency to rotate in the direction of the arrows, as indicated in Figs. 3 and 4, by means of the coiled spring 85, but is restrained from yielding to this tendency, except once in twenty-four hours, by means of a suitable mechanism controlled by the clock. The mechanism which I prefer for this purpose is that shown more particularly in Figs. 5, 7, 8, and 9, in which the pinion 48 is provided with an eccentric pin or crank 96, which engages a slot 97 in the upper end of a vibrating lever 98, mounted on a shaft 99 in a depending bracket 100. On the shaft 99 is mounted a segmental plate 101, which is adapted to pass between and successively engage the seven teeth of a pinion or escapement-wheel 102 on the shaft 79, said segmental plate being provided with a notch or recess 103, extending through its lower edge and of sufficient size to permit the passage of the teeth of the pinion or escapement-wheel 102. The rear face of the plate 101 is recessed adjacent to the notch 103, as shown at 104 in Fig. 9, to receive a pivoted plate or shutter 105, which is pivoted at its upper end upon an axis 106 to the segmental plate 101 and which when held in position in the recess 104 fits within said recess and lies with its outer face flush with the rear face of the segmental plate 101. A spring 107, having one end fixed to the plate 101 and its other end free and bearing against the pivoted plate or shutter 105, serves to force said shutter normally outward away from the plate 101. It will be seen that as the gear-wheel 48 rotates a vibrating movement is imparted to the lever 98 and thence to the segmental plate 101 and the parts carried thereby. One of the teeth of the pinion or escapement-wheel 102 is held against the back of the plate 101 by the action of the spring 85, said plate preventing the pinion and shaft from rotating during this engagement. During the initial portion of this engagement the tooth of the pinion bears against the pivoted plate or shutter 105, and when the tooth passes clear of the shutter the spring 107 forces the shutter out into the position shown in Fig. 8 of the drawings. During the remainder of the movement of vibration of the segmental plate 101 the tooth bears against the rear face of said plate, passing at the end of its return movement between the shutter 105 and the body of the plate until it comes directly opposite the notch 103, whereupon it passes through said notch, at the same time permitting the shaft 79 to be rotated one-seventh of a revolution by the action of the spring 85. At the same time the next notch of the pinion comes in contact with the rear face of the pivoted plate or shutter 105 and, moving the same forward into contact with the plate 101, is arrested by such contact and held stationary until the next period of release.

In the particular form of construction shown in Figs. 3, 4, and 5 the gear-wheel 48 is small and revolves once in twelve hours. Since the shifting movement of the shaft 79 should only take place once in twenty-four hours, it is necessary when this form of mechanism is employed to provide means for preventing the escapement from acting oftener than once in twenty-four hours, and for this purpose I employ a stop 108, secured to a rod 109, connected to the lever 30 and actuated thereby. As shown in Fig. 3, the arrangement is such that when the lever 30 is depressed so as to bring the day-contacts into use the stop 108 bears against the rear of the shutter 105 and prevents the same from springing outward after a tooth has passed clear of it, so that upon the first return of the notch and shutter the tooth again passes back of the shutter and is prevented from passing through the notch. When, however, the lever is lifted to bring the night-contacts into use, the stop 108 passes upward clear of the shutter, so that the same may spring rearward and permit the tooth to pass through the notch. In other words, the stop 108 prevents the shifting of the calendar and the movement of the shaft 79 at twelve o'clock noon, but permits this shifting and movement to occur at twelve o'clock midnight. I prefer to employ this construction, wherein the pinion 48 rotates once in twelve hours, for the reason that when the clock is shipped to a distance and there set up by those who are not thoroughly familiar with its mechanism the structure shown absolutely precludes the setting of the clock in such a way as to cause the calendar to shift at noon instead of midnight, as it should do. Of course, however, under certain circumstances this feature may be of such minor importance as to be disregarded, and under these circumstances I may employ a gear-wheel 48, which, like the gear-wheel 49, rotates only once in twenty-four hours, in which case the stop 108 and its connections may be dispensed with, although it will be necessary to exercise care to so set the clock that the necessary shifting of the calendar will occur at midnight and not at noon.

There is mounted on the shaft 79, as hereinbefore stated, a second roller, (indicated at 110,) said roller being preferably heptagonal in cross-section and having inscribed upon its seven faces the names of the seven days of the week. This roller is mounted loosely on the shaft 79, but is operatively connected therewith by means of a pawl 111, pivotally mounted on the end of the roller and caused by means of a spring 112 to engage with a notched or recessed disk 113, secured on the shaft 79. The pawl 111 has a tooth 114, while the disk 113 is provided with seven notches 115, with either one of which the tooth 114 may engage. The pawl 111 has arms 116 projecting on each side of its pivot, so that the pawl may be readily operated from either side to disengage it from the disk. The arrangement is such that the roller 110 rotates along with the shaft 79, but may be readily disengaged from said shaft in order to alter its position relatively thereto.

The calendar portion of the clock is completed by means of an endless band 117, serving to indicate the months and located intermediate the rollers 110 and 81 and passing over the rollers 118 and 119, upon which it may be operated by hand in order to make the necessary shifting at the end of each month. The door 17 will be of course provided with a glazed opening in order to render the monthly indicator visible.

It will be understood, of course, that by means of the spring 85 the shaft 79 will be given one-seventh of a revolution once every twenty-four hours, this movement being controlled by the escapement so as to occur at midnight. When the end of the month is reached, whether it be a month of twenty-eight or thirty-one days or any intermediate number of days, the calendar is reset in the following manner: The strap or band 95, which has been wound upon the drum 94 during the month, is unwound by pulling upon the same, thereby rotating the roller 81 until the plate indicating the first day of the month becomes visible. This movement of the roller is permitted, of course, by reason of the pawl-and-ratchet connection with the shaft 79 and serves at the same time to rewind the spring 85. The pinion 80 is secured to the roller 81, being loosely mounted on the shaft 79, so that the resetting of the roller 81 to indicate the first day of the month will at the same time rotate the gear-wheel 67 so as to cause the arm 68 thereof to come into contact with that one of the contacts 64 which is connected with the compartment 59 corresponding with the first day of the month. The name of the month may be changed by hand, as hereinbefore stated. The provision for adjusting the roller 110 upon the shaft 79 is to provide for the initial setting of the clock and calendar when first started or for the resetting of it when it has for any reason run down.

As stated at the beginning of this specification, the foregoing description applies to the specific embodiment of my invention in a concrete form which is shown in the drawings. It is obvious, however, that the principle thereof may be embodied in other forms, and the foregoing description is therefore to be regarded, in so far as the details of construction are concerned, as a description of one specific form only of my invention in order to enable those skilled in the art to understand the same. I therefore do not wish to be understood as limiting myself strictly to the precise details of construction hereinbefore described and shown in the drawings.

I claim—

1. In a program-clock, the combination, with a battery or other source of electricity, and an audible signal, of a clock mechanism, a contact-arm actuated thereby, a series of fixed contacts adapted to be successively engaged by said contact-arm, which passes over them once in twelve hours, a series of movable contacts respectively connected to the corresponding fixed contacts, two sets of fixed contacts, with either of which sets said movable contacts may be connected, means for making or breaking any one or more of the individual circuits thus formed, and suitable circuits connecting the battery, signal and contacts, substantially as described.

2. In a program-clock, the combination, with a battery or other source of electricity, and an audible signal, of a clock mechanism, a contact-arm actuated thereby, a series of fixed contacts over which said contact-arm passes once in twelve hours, a series of movable contacts respectively connected to the corresponding fixed contacts, two sets of fixed contacts, with either of which sets said movable contacts may be connected, a second contact-arm actuated by the clock mechanism, and suitable circuits connecting the battery, signal, contacts and contact-arms, whereby said second contact-arm will close a circuit and give an audible signal at the end of each twelve hours of travel of the first contact-arm, substantially as described.

3. In a program-clock, the combination, with a battery or other source of electricity, and an audible signal, of a clock mechanism, a calendar-shaft provided with means for indicating the day of the month, comprising a roller having a ratchet connection with said shaft, means controlled by the clock mechanism for imparting a step-by-step movement to said shaft once in twenty-four hours, a contact-arm connected with said roller by intermediate gearing, a series of contacts, corresponding in number with the days of the month, over which said contact-arm travels, a second series of fixed contacts respectively connected with said first-mentioned series, means for making and breaking the individual circuits thus formed, and suitable circuits connecting the battery, signal, contacts and contact-arm, substantially as described.

4. In a program-clock of the character described, the combination, with the clock mechanism and its contact and signaling devices, of a series of compartments each having a contact, and a corresponding series of contact-levers in the circuit, one for each compartment and adapted, when engaged with the corresponding contact, to permit access to the compartment and, when disengaged therefrom, to close the same, substantially as described.

WILLIAM H. HALL.

Witnesses:
FREDERICK C. GOODWIN,
IRVINE MILLER.